(12) United States Patent
Chen

(10) Patent No.: US 6,273,518 B1
(45) Date of Patent: Aug. 14, 2001

(54) BICYCLE WHEEL RIM

(75) Inventor: Chao-Ying Chen, Tainan Hsien (TW)

(73) Assignee: Alex Machine Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/591,817

(22) Filed: Jun. 12, 2000

(30) Foreign Application Priority Data

Apr. 19, 2000 (TW) .............................. 089206388

(51) Int. Cl.⁷ .................................................. B60B 21/00
(52) U.S. Cl. ...................................................... 301/95
(58) Field of Search ................................. 301/95, 96, 97, 301/98, 6.9; 188/24.11, 24.12, 344

(56) References Cited

U.S. PATENT DOCUMENTS

| | | | |
|---|---|---|---|
| 3,305,048 | * | 2/1967 | Brilando ............................ 188/24.11 |
| 3,433,327 | * | 3/1969 | Regis ..................................... 301/95 |
| 3,732,951 | * | 5/1973 | Hata et al. ......................... 188/24.11 |
| 5,064,027 | * | 11/1991 | Akamatsu .......................... 188/24.12 |
| 6,065,812 | * | 5/2000 | Lee ......................................... 301/95 |
| 6,109,399 | * | 8/2000 | Crawford et al. ................. 188/24.11 |
| 6,120,105 | * | 9/2000 | Chern ..................................... 301/95 |

* cited by examiner

Primary Examiner—S. Joseph Morano
Assistant Examiner—Long Buo Nguyen
(74) Attorney, Agent, or Firm—Townsend and Townsend and Crew LLP

(57) ABSTRACT

A bicycle wheel rim includes spaced left and right annular tire retaining walls adapted for retaining a bicycle tire therebetween. Each of the tire retaining walls has a central axis, a radial inner edge proximate to the central axis, a radial outer edge distal to the central axis, and a brake pad contacting surface opposite to the other one of the tire retaining walls. An annular spoke mounting wall interconnects the radial inner edges of the tire retaining walls. The brake pad contacting surface of at least one of the tire retaining walls is formed with a plurality of radial grooves which are spaced apart from each other in a circumferential direction relative to the central axis and which extend along radial directions of the tire retaining walls from the radial inner edge to the radial outer edge. Each of the radial grooves has at least two opposite open ends formed respectively through the radial inner and radial outer edges.

3 Claims, 6 Drawing Sheets

BICYCLE WHEEL RIM

BACKGROUND OF THE INVENTION

1. Field of the Invention

The present invention relates to a bicycle wheel rim, more particularly to a bicycle wheel rim with an enhanced braking effect.

2. Description of the Related Art

U.S. Pat. No. 3,433,327 discloses a bicycle wheel rim 1 which, as shown in FIG. 1, has an external braking surface that is formed with a series of parallel grooves 11 in an undulating pattern and a plurality of transverse grooves 13 that extend in radial directions to interconnect the undulating parallel grooves 11. When it rains, or when the bicycle is ridden through puddles of water, the water collected in the parallel grooves 11 can escape laterally via the transverse grooves 13 and travel away from the center of the braking surface so as to pass beyond the area to which a brake pad is applied. However, as the transverse grooves 13 do not open at a radial inner edge portion 14 of the braking surface, and at a radial outer edge portion 15 of the same, water can still accumulate in the undulating parallel grooves 11 and the transverse grooves 13 to form a fluid film that lubricates the braking surface, especially when the bicycle is ridden under heavy rain conditions.

SUMMARY OF THE INVENTION

Therefore, the object of the present invention is to provide a bicycle wheel rim with a relatively good draining effect for draining water from a brake pad contacting surface thereof so as to provide an enhanced braking effect.

Accordingly, the bicycle wheel rim of the present invention includes spaced left and right annular tire retaining walls adapted for retaining a bicycle tire therebetween. Each of the tire retaining walls has a central axis, a radial inner edge proximate to the central axis, a radial outer edge distal to the central axis, and a brake pad contacting surface opposite to the other one of the tire retaining walls. An annular spoke mounting wall interconnects the radial inner edges of the tire retaining walls. The brake pad contacting surface of at least one of the tire retaining walls is formed with a plurality of radial grooves which are spaced apart from each other in a circumferential direction relative to the central axis, and which extend along radial directions of said at least one of the tire retaining walls from the radial inner edge to the radial outer edge. Each of the radial grooves has at least two opposite open ends formed respectively through the radial inner and radial outer edges of said at least one of the tire retaining walls.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
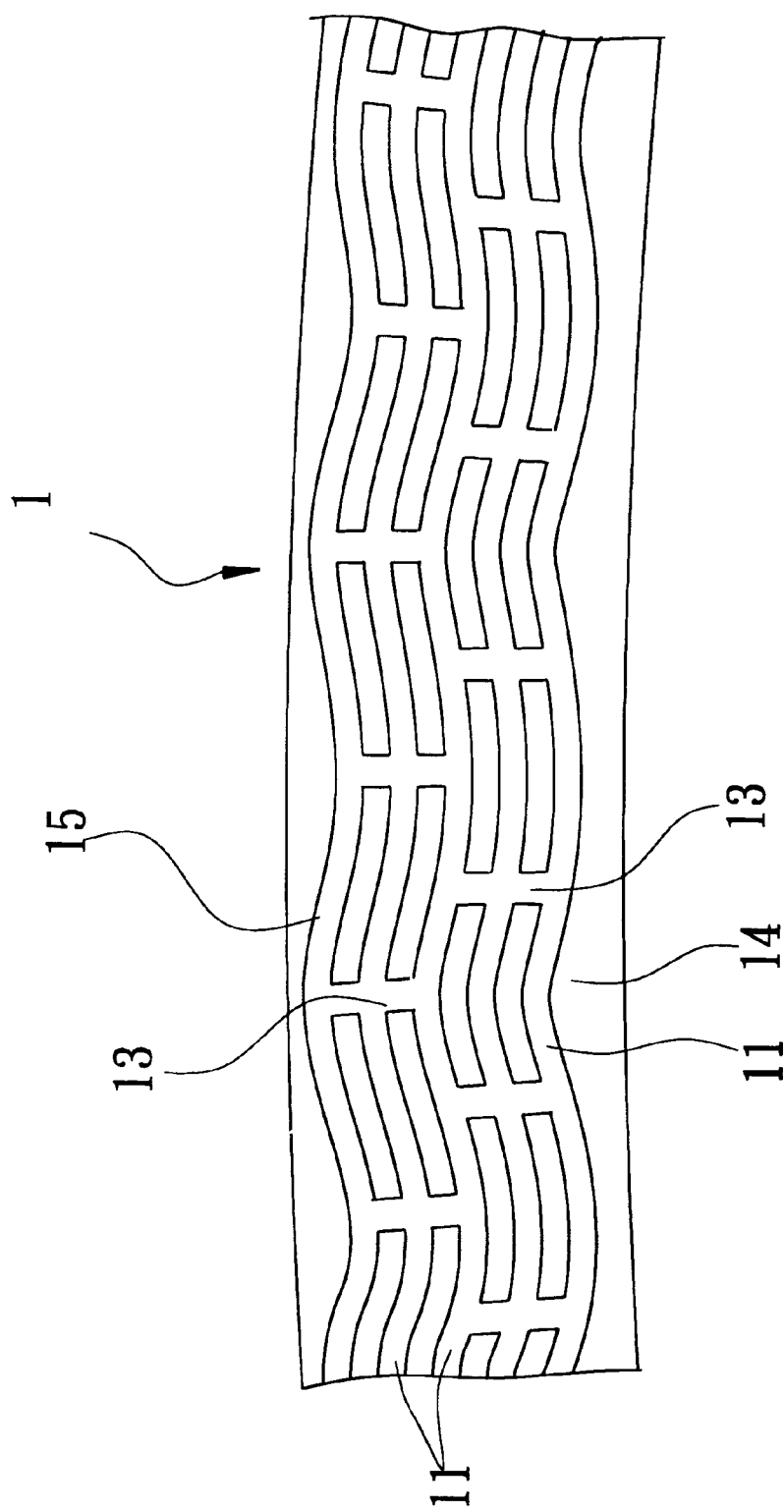
FIG. 1 is an enlarged fragmentary view showing the braking surface of a conventional bicycle wheel rim.
Figure 2:
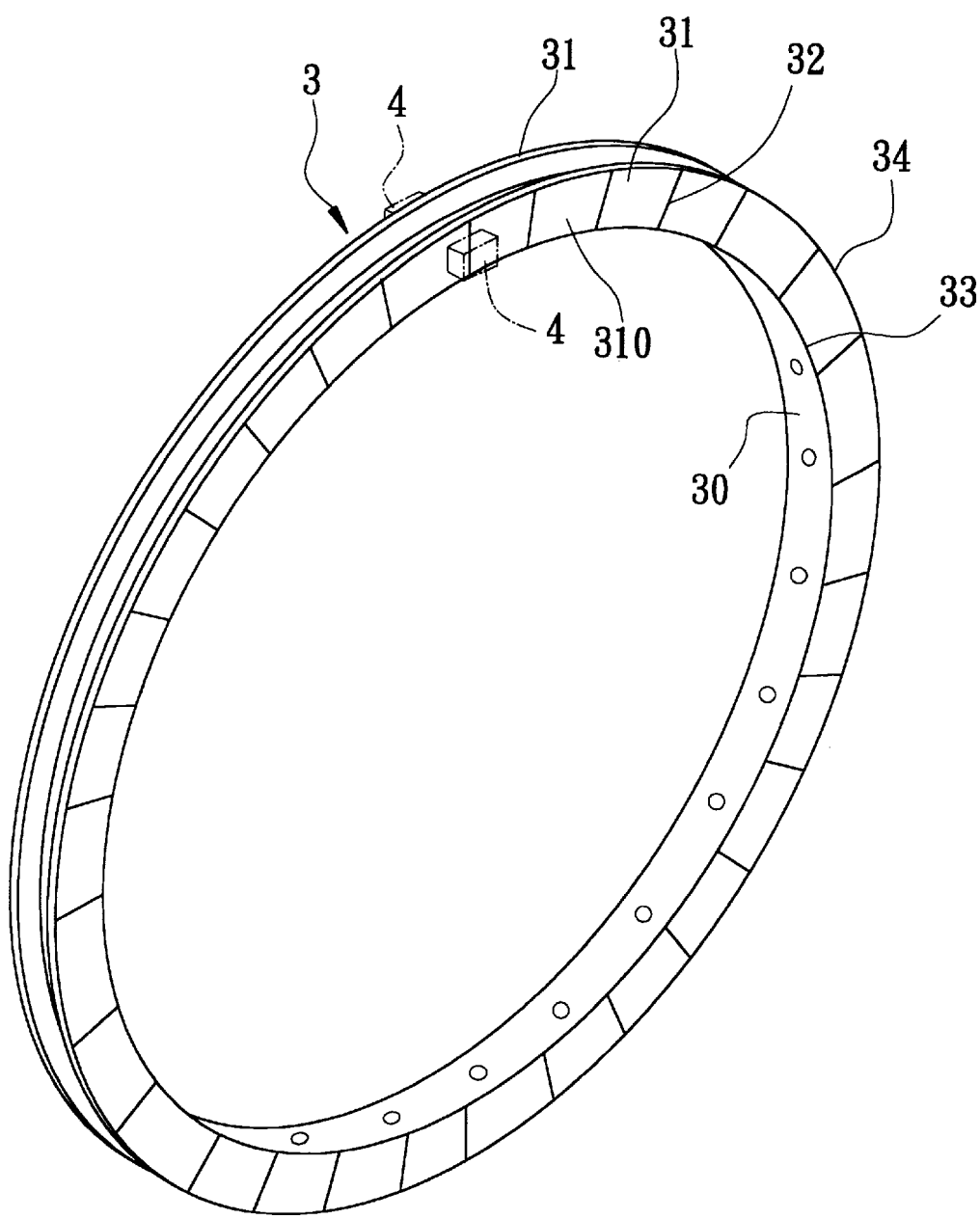
FIG. 2 is a perspective view illustrating a first preferred embodiment of a bicycle wheel rim of the present invention.
Figure 3:
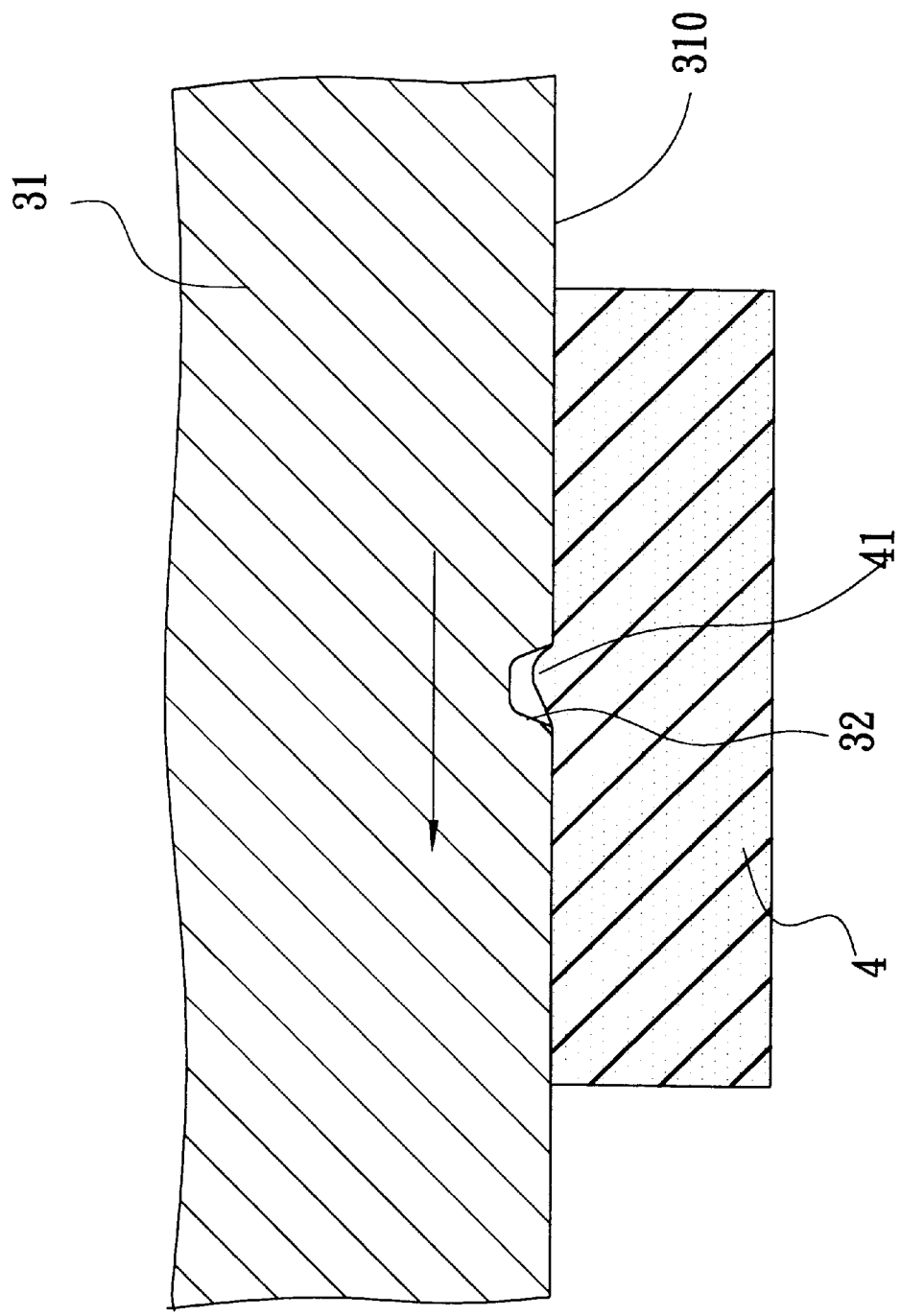
FIG. 3 is a fragmentary sectional view illustrating the first preferred embodiment when a brake pad is applied thereon.
Figure 4:
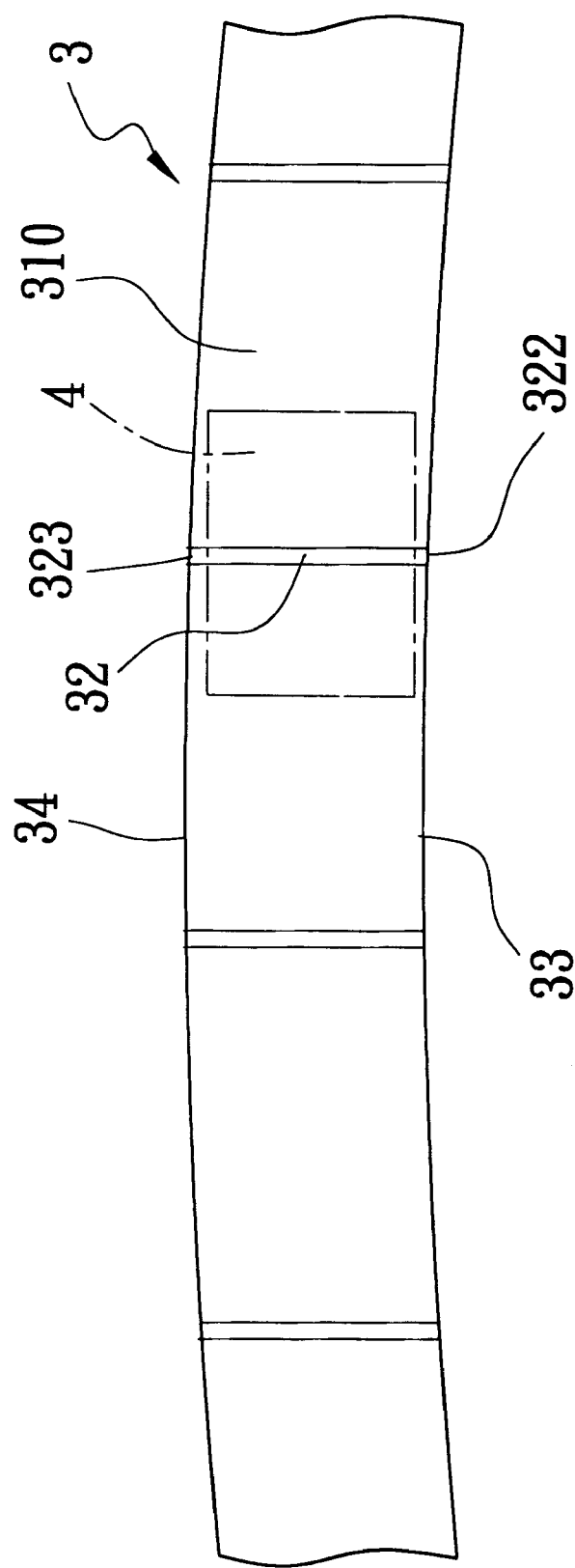
FIG. 4 is a fragmentary side view of the first preferred embodiment.

Referring to FIGS. 2 to 4, the first preferred embodiment of the bicycle wheel rim 3 of the present invention is made of extruded aluminum, and includes spaced left and right tire retaining walls 31 adapted for retaining a bicycle tire (not shown) therebetween. Each of the left and right tire retaining walls 31 has a radial inner edge 33 proximate to a central axis thereof, and a radial outer edge 34 distal to the central axis. An annular spoke mounting wall 30 interconnects the radial inner edges 33 of the tire retaining walls 31. Each of the tire retaining walls 31 has an inner surface facing the other one of the tire retaining walls 31, and an outer brake pad contacting surface 310 opposite to the other one of the tire retaining walls 31 and adapted for contacting a brake pad 4.

The brake pad contacting surface 310 of each of the tire retaining walls 31 is formed with a plurality of radial grooves 32 which are spaced apart from each other in a circumferential direction relative to the central axis and which extend along radial directions from the radial inner edge 33 to the radial outer edge 34 of the respective one of the tire retaining walls 31. Each of the radial grooves 32 extends along a straight line, and has two open ends 322, 323 formed respectively through the radial inner edge 33 and the radial outer edge 34 of the respective one of the tire retaining walls 31. The radial grooves 32 may be formed by knurling or with the use of a CNC lathe.

When the brake pad 4 moves to one of the radial grooves 32 during rotation of the wheel rim 3 about the central axis, the brake pad 4 has a portion 41 that extends resiliently into said one of the radial grooves 32. As the grooves 32 extend in radial directions which are transverse to the moving direction of the wheel rim 3, the portion 41 of the brake pad 4 thus retards rotation of the wheel rim 3. When the bicycle is ridden under rain or along a wet road, water collected in the radial grooves 32 can escape in the radial direction through the open ends 322, 323 to prevent the formation of a fluid film on the brake pad contacting surface 310.

The radial grooves 32 also serve the purpose of wear indication. When the radial grooves 32 become nonobservable, the user is alerted that wearing of the bicycle wheel rim 3 to a predetermined extent has occurred and that replacement of the bicycle wheel rim should be conducted.

Figure 5:
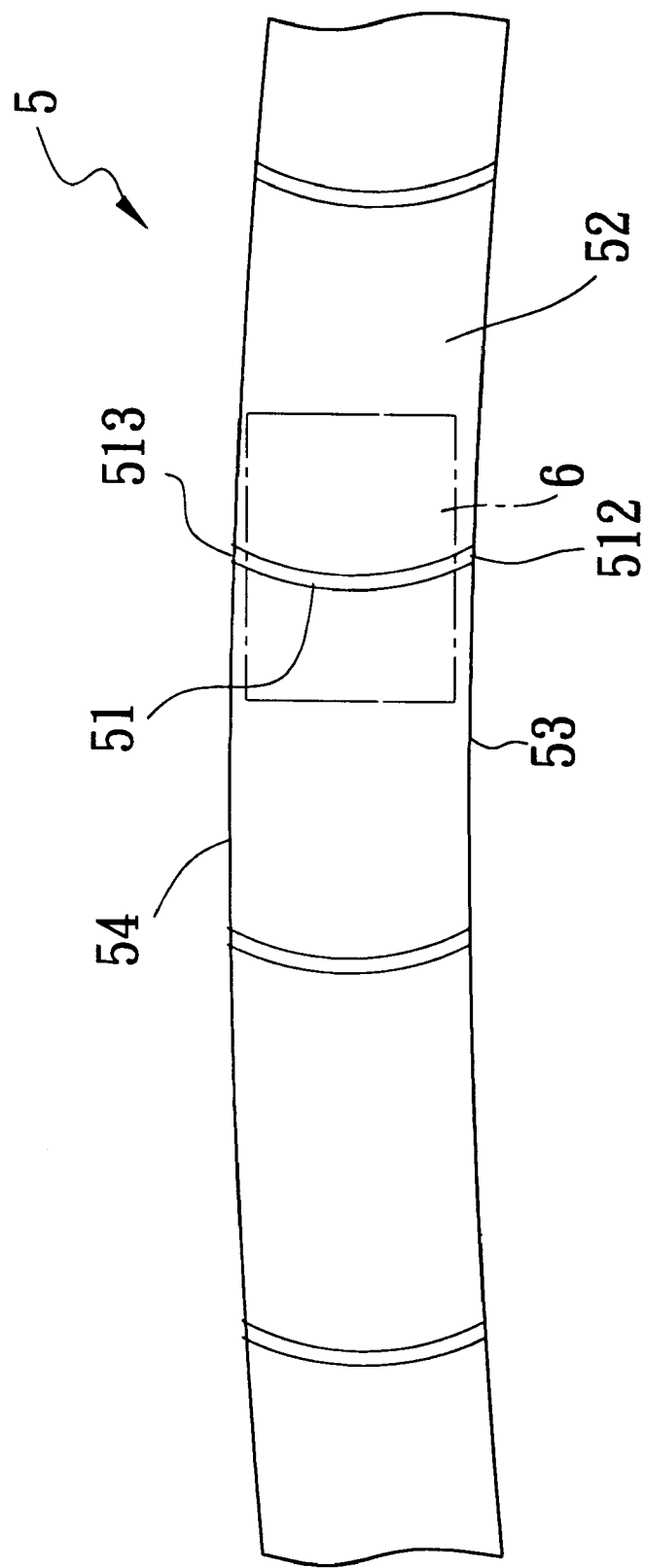
FIG. 5 is a fragmentary side view of a second preferred embodiment of the bicycle wheel rim of the present invention.

Referring to FIG. 5, the bicycle wheel rim 5 of the second preferred embodiment of the present invention is generally similar to the previous embodiment, except that each of the radial grooves 51 extends along a curved line. Each of the radial grooves 51 also has two open ends 512, 513 formed respectively through radial inner and radial outer edges 53, 54 of the respective tire retaining wall 52. The resulting draining effect is relatively good since the radial grooves 51 are curved. Moreover, during contact of the brake pad 6 with one of the radial grooves 51 when the wheel rim 5 rotates, the brake pad 6 contacts different portions of the radial groove 51 at different times. This results in gradual braking of the bicycle wheel, and reduces the discomfort caused by intermittent and sudden braking.

Figure 6:
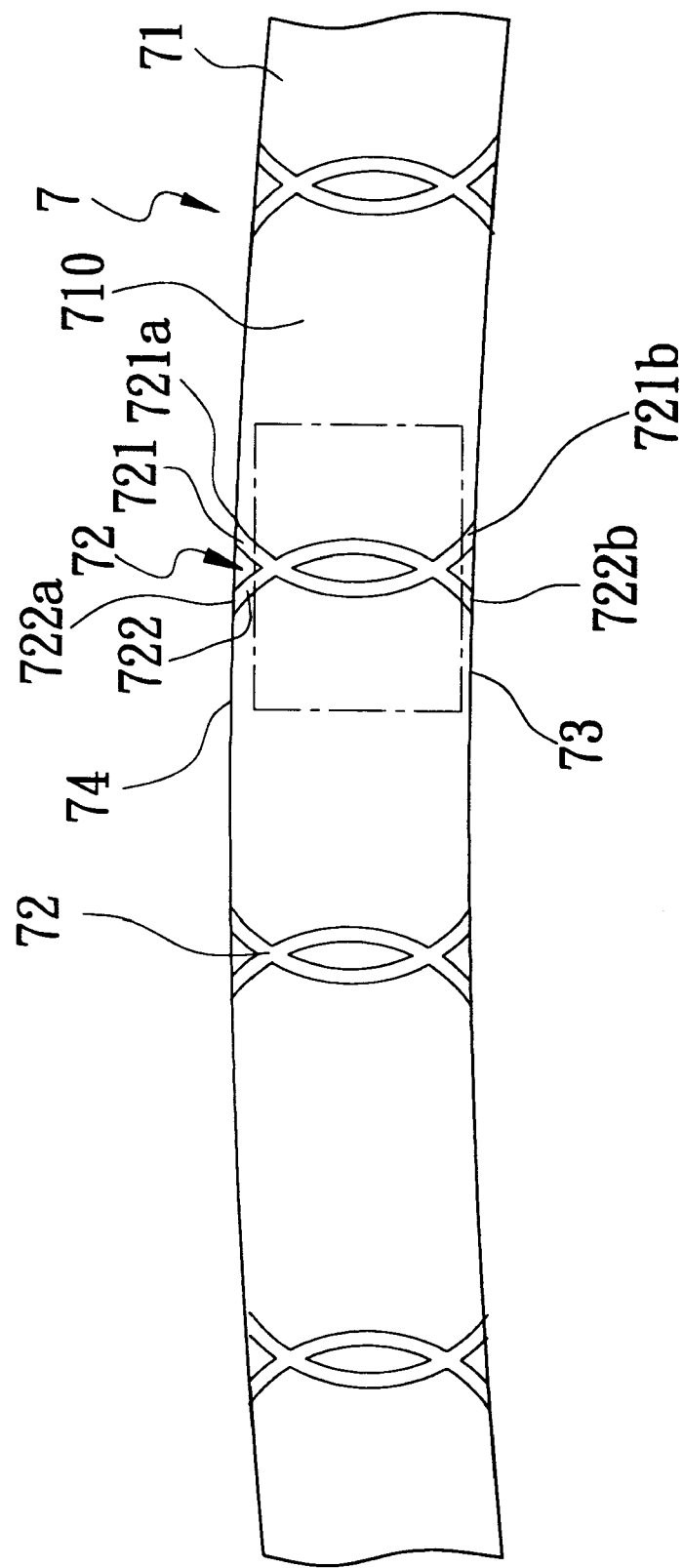
FIG. 6 is a fragmentary side view of a third preferred embodiment of the bicycle wheel rim of the present invention.

Referring to FIG. 6, the bicycle wheel rim 7 of the third preferred embodiment of the present invention is generally similar to the previous embodiments, except that each of the radial grooves 72 in the brake pad contacting surface 710 of a respective one of the tire retaining walls 71 includes a first groove portion 721 that extends along a first curved line, and a second groove portions 722 that extends along a second curved line. The second curved line curves in a direction opposite to that of the first curved line, and intersects the first curved line at two points. Each of the first and second groove portions 721, 722 has two open ends 721*a*, 721*b*, 722*b*, 722*b* formed through the radial inner and radial outer edges 73, 74 of the respective tire retaining wall 71.

Accordingly, by forming radially extending grooves 32, 51, 72 with opposite open ends through radial inner and radial outer edges of the respective tire retaining wall, the water collected in the grooves 32, 51, 72 can be drained from the respective brake pad contacting surface in a relatively efficient manner to ensure the braking effect of the bicycle wheel rim, especially under heavy rain conditions.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim comprising:

spaced left and right annular tire retaining walls adapted for retaining a bicycle tire therebetween, each of said tire retaining walls having a central axis, a radial inner edge proximate to the central axis, a radial outer edge distal to the central axis, and a brake pad contacting surface opposite to the other one of said tire retaining walls; and an annular spoke mounting wall interconnecting said radial inner edges of said tire retaining walls;

said brake pad contacting surface of at least one of said tire retaining walls being formed with a plurality of radial grooves which are spaced apart from each other in a circumferential direction relative to the central axis and which extend along radial directions of said at least one of said tire retaining walls from said radial inner edge to said radial outer edge, each of said radial grooves having at least two opposite open ends formed respectively through said radial inner and radial outer edges of said at least one of said tire retaining walls, wherein said each of said radial grooves extends along a curved line.

2. A bicycle wheel rim comprising:

spaced left and right annular tire retaining walls adapted for retaining a bicycle tire therebetween, each of said tire retaining walls having a central axis, a radial inner edge proximate to the central axis, a radial outer edge distal to the central axis, and a brake pad contacting surface opposite to the other one of said tire retaining walls; and an annular spoke mounting wall interconnecting said radial inner edges of said tire retaining walls;

said brake pad contacting surface of at least one of said tire retaining walls being formed with a plurality of radial grooves which are spaced apart from each other in a circumferential direction relative to the central axis and which extend along radial directions of said at least one of said tire retaining walls from said radial inner edge to said radial outer edge, each of said radial grooves having at least two opposite open ends formed respectively through said radial inner and radial outer edges of said at least one of said tire retaining walls, wherein each of said radial grooves includes a first groove portion which extends along a second curved line, the second curved line curving in a direction opposite to that of the first curved line and intersecting the first curved line at two points.

3. The bicycle wheel rim according to claim 2, wherein said first groove portion of each of said radial grooves has two of said open ends formed respectively through said radial inner and radial outer edges of said at least one of said tire retaining walls, and said second groove portion of each of said radial grooves has two of said open ends formed respectively through said radial inner and radial outer edges of said at least one of said tire retaining walls.

* * * * *